No. 730,327. PATENTED JUNE 9, 1903.
G. A. WOODMAN.
JOURNAL BEARING.
APPLICATION FILED MAY 26, 1902.
NO MODEL.
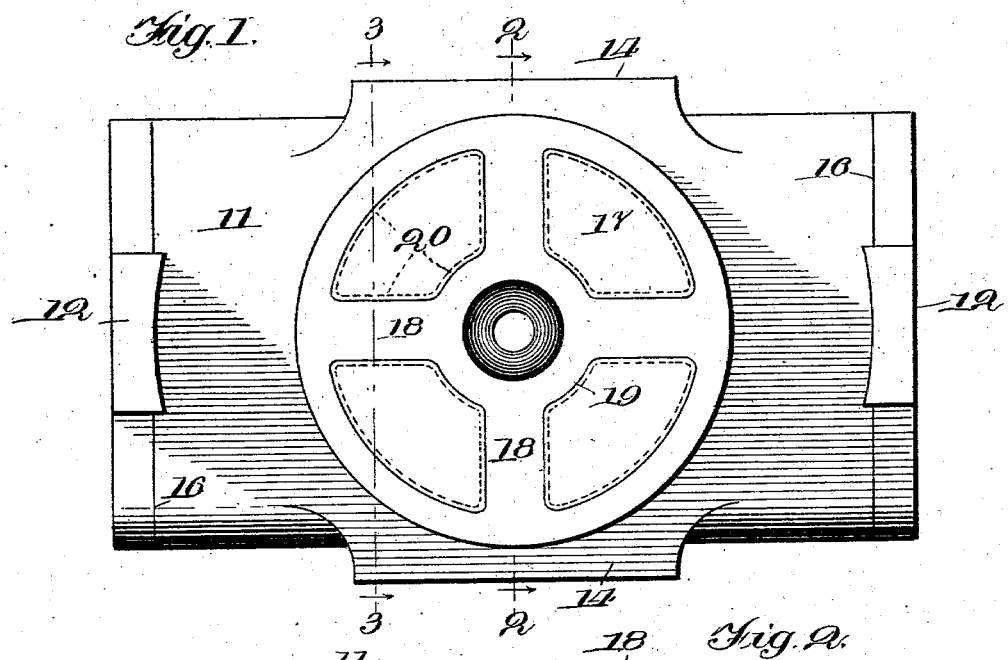
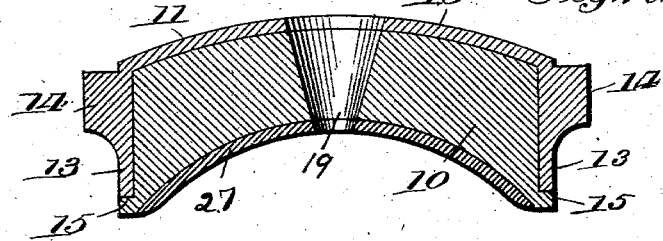
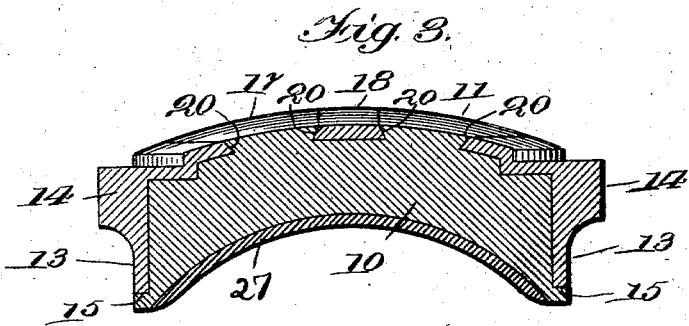
Witnesses:
H. S. Gaither
Helen L. Peck
Inventor:
George A. Woodman
by Wm. P. Belt
Attorney No. 730,327. Patented June 9, 1903.

UNITED STATES PATENT OFFICE.

GEORGE A. WOODMAN, OF CHICAGO, ILLINOIS, ASSIGNOR TO AUGUST J. WEIL, OF NEW YORK, N. Y.

JOURNAL-BEARING.

SPECIFICATION forming part of Letters Patent No. 730,327, dated June 9, 1903.

Application filed May 26, 1902. Serial No. 109,039. (No model.)

*To all whom it may concern:*

Be it known that I, GEORGE A. WOODMAN, a citizen of the United States, residing at Chicago, in the county of Cook and State of Illinois, have invented certain new and useful Improvements in Journal-Bearings, of which the following is a specification.

This invention relates to journal-bearings, and is particularly adapted for use in a car-axle bearing designated and popularly known as the "universal," which comprises concavo-convex bearing-faces on the brass and the wedge or key employed to hold the brass in the journal-box.

The primary object of the invention is to reduce the cost of manufacture of the bearing without in any way impairing its strength or changing its general character and operation, and this I accomplish by providing for the bearing a back which is made of malleable iron or other suitable metal and permanently uniting the back with the body.

I have illustrated my invention as embodied in the universal bearing in the accompanying drawings, in which—

Figure 1 is a top plan view. Fig. 2 is a sectional view on the line 2 2 of Fig. 1. Fig. 3 is a sectional view on the line 3 3 of Fig. 1.

Referring to the drawings, 10 designates the body of the bearing, which may be made of brass or other suitable metal, and 11 is the back for the body and is preferably made of malleable iron, but may also be made of other suitable metal. The back extends longitudinally of the bearing between the end lugs 12 and has depending sides 13, provided with side lugs 14 of suitable size and shape. The back is made to conform to the usual outline of the bearing and takes the place, in effect, of so much brass or other metal, and being much cheaper than the brass thereby effects a great saving in the cost of manufacture of the bearing without in any way destroying its identity and without impairing its strength or in any way shortening its life. The depending sides of the back are seated against shoulders 15 on the body, and the ends of the back are seated against shoulders 16 at the ends of the bearing.

In car-axle bearings of the universal type a central convex circular portion is provided on the bearing to fit and work easily in a complementary concave portion on the key or wedge employed for holding the bearing in a journal-box, and in embodying my invention therewith I cut out the back at this convex portion of the bearing in a suitable manner, so that the brass may come up through the opening formed thereby to the surface and lie flush with the outer face of the back. In the drawings I have shown one way in which this result may be effected and which consists in providing the back with a number of openings 17, separated by radial ribs or bridges 18, which are connected at their inner ends to a circular rib 19 and at their outer ends to the ends and sides of the back. In the casting operation the body metal will run in and fill up these openings in the back and lie flush with the outer face of the back. The edges 20 of the ribs and other portions of the back surrounding the openings therein are preferably dovetailed, so that a secure and permanent connection will be effected between the body metal and the back.

It is apparent that the back may be cut out into skeleton form in a great variety of ways to accommodate the body metal in the manner described, and I do not limit myself to any particular construction of skeleton back, nor do I limit myself to the embodiment of a skeleton back with a bearing of the universal type or to car-axle bearings alone, but desire to cover the use of a skeleton back of this character with all kinds of journal-bearings.

In the drawings I have illustrated the bearing provided with a lining 27, of Babbitt metal or other lubricating material, and a central opening 19; but they may be provided or omitted, as desired.

A journal-bearing embodying my invention can be manufactured at much less cost than those bearings which are made wholly of brass or other bearing metal, and the back is so rigidly and effectively united with the body by my invention that it forms to all intents and purposes an integral part therewith and the bearing is as strong as if cast solid.

Having thus fully described my invention, what I claim, and desire to secure by Letters Patent, is—

1. A journal-bearing comprising a body and a back, said back being provided with a number of openings extending entirely therethrough and separated by ribs and said body being located beneath and within said back and filling said openings.

2. A journal-bearing comprising a body, and a back for the body made of a different kind of metal and provided at its central portion with circularly-arranged and alternate openings and ribs, the openings being filled with the body metal.

3. A journal-bearing comprising a body, a back for the body made of a different kind of metal and having a circular central rib, radial ribs extending therefrom and openings between said ribs to receive the body metal.

4. A journal-bearing comprising a body and a back made of different kinds of metal, said back being provided with openings extending entirely therethrough, said body being located beneath and within said back and filling said openings, said openings being separated by ribs having dovetailed edges to form locking engagement with the body metal.

5. A journal-bearing provided with a circular convex central portion on its back and comprising a body and a back made of different kinds of metal, said back being provided at said convex portion with openings extending entirely therethrough and filled with the body metal, said openings being separated by radially-disposed ribs.

GEORGE A. WOODMAN.

Witnesses:
R. D. HOPPING,
JAY E. VAN VLACK.